United States Patent
Vetter et al.

(10) Patent No.: US 8,532,944 B2
(45) Date of Patent: Sep. 10, 2013

(54) INTELLIGENT ELECTRONIC DEVICE CONFIGURATION VERIFICATION

(75) Inventors: Claus Vetter, Buchs (CH); Aleksandra Kuc-Dzierzawska, Kraków (PL); Jakub Sipowicz, Kraków (PL); Christian Frei, Fislisbach (CH); Michael Obrist, Baden (CH)

(73) Assignee: ABB Research Ltd, Zürich (CH)

( * ) Notice: Subject to any disclaimer, the term of this patent is extended or adjusted under 35 U.S.C. 154(b) by 389 days.

(21) Appl. No.: 12/256,997

(22) Filed: Oct. 23, 2008

(65) Prior Publication Data

US 2009/0070051 A1    Mar. 12, 2009

Related U.S. Application Data

(63) Continuation of application No. PCT/EP2007/053889, filed on Apr. 20, 2007.

(30) Foreign Application Priority Data

Apr. 24, 2006  (EP) .................................... 06405175

(51) Int. Cl.
*G01R 15/00* (2006.01)
*G05D 3/12* (2006.01)

(52) U.S. Cl.
USPC ............................................ 702/57; 700/292

(58) Field of Classification Search
USPC .............. 702/57, 60–62, 64–65, 81, 84, 117, 702/122, 182–184, 188; 700/286, 292, 295, 700/297; 703/18; 709/220–221; 370/254, 370/257; 715/700, 740, 762–763; 713/1, 713/100

See application file for complete search history.

(56) References Cited

U.S. PATENT DOCUMENTS

| | | | |
|---|---|---|---|
| 5,963,734 A | 10/1999 | Ackerman et al. | |
| 6,671,635 B1 | 12/2003 | Forth et al. | |
| 7,426,694 B2* | 9/2008 | Gross et al. | 715/762 |
| 8,051,215 B2* | 11/2011 | Balgard et al. | 710/8 |
| 8,156,061 B2* | 4/2012 | Vetter et al. | 706/45 |
| 8,165,841 B2* | 4/2012 | Vetter et al. | 702/122 |
| 2002/0173927 A1 | 11/2002 | Vandiver | |
| 2005/0182979 A1 | 8/2005 | Gross et al. | |

OTHER PUBLICATIONS

Wimmer, W., IEC 61850 SCL—More Than Interoperable Data Exchange Between Engineering Tools, Aug. 22-26, 2005, 15th Power System Computation Conference, Liege/Belgium, 5 pages.*

(Continued)

*Primary Examiner* — Toan Le

(74) *Attorney, Agent, or Firm* — Buchanan Ingersoll & Rooney PC

(57) ABSTRACT

An exemplary Substation Automation testing tool for IEC 61850 compliant substations is disclosed. The testing tool verifies the configuration of a first Intelligent Electronic Device (IED) that is part of a Substation Automation (SA) system and initially configured to perform measurement, protection and/or control functions in accordance with a substation configuration specification. Configuration information is first read from an internal server of the first IED and transformed according to a dedicated data model. Related information is then read from a second IED that has initially been configured to perform the same functions as the first IED, or from a Substation Configuration Description (SCD) file, and likewise transformed. The transformed data is then compared in order to identify discrepancies or inconsistencies and to resolve errors introduced by the IED configuration process.

7 Claims, 1 Drawing Sheet

(56) References Cited

OTHER PUBLICATIONS

IEC 61850—Conference Papers & Articles.*
Form PCT/ISA/210 (International Search Report) dated Aug. 24, 2007.
Form PCT/ISA/237 (Written Opinion of the International Searching Authority) dated Aug. 24, 2007.
European Search Report dated Oct. 24, 2006.
F. Crispino et al., "An Experiment Using an Object-Oriented Standard—IEC 61850 to Integrate IEDs Systems in Substations", 2004 IEEE/PES Transmission & Distribution Conference & Exposition: Latin America, Nov. 8-11, 2004, pp. 22-27, XP-010799829.
Alexander Apostolov., "XML Applications to UCA2.0/IEC-61850 Object Modeling", IEEE Power Engineering Society, Jul. 21-25, 2002, vol. vol. 2 of 3, pp. 297-299, XP-010610542.
Klaus-Peter Brand, "The Standard IEC 61850 as Prerequisite for Intelligent Applications in Substations", Power Engineering Society General Meeting, IEEE, Jun. 6-10, 2004, pp. 714-718 XP-010756486.
A. Apostolov, "Functional Testing of IEC 61850 Based IEDs and Systems", IEEE, Oct. 10, 2004, pp. 1683-1688, XP-010788023.
Wolfgang Wimmer, "IEC 61850 SCL—More Than Interoperable Data Exchange Between Engineering Tools", International Electrotechnical Committee, Geneva, Communication Networks and Systems in Substations, 5 pages Aug. 22-26, 2005.

* cited by examiner

INTELLIGENT ELECTRONIC DEVICE CONFIGURATION VERIFICATION

RELATED APPLICATIONS

This application claims priority under 35 U.S.C. §119 to EP Application 06405175.8 filed in Europe on Apr. 24, 2006, and as a continuation application under 35 U.S.C. §120 to PCT/EP2007/053889 filed as an International Application on Apr. 20, 2007 designating the U.S., the entire contents of which are hereby incorporated by reference in their entireties.

TECHNICAL FIELD

The disclosure relates to the field of Substation Automation systems with a standardized configuration representation. More particularly, it relates to a method of verifying the configuration of a first Intelligent Electronic Device in the SA system.

BACKGROUND INFORMATION

Substations for power distribution in high and medium voltage power networks include primary or field devices such as electrical cables, lines, bus bars, switches, breakers, power transformers and instrument transformers arranged in switch yards and/or bays. These primary devices are operated in an automated way via a Substation Automation (SA) system responsible for controlling, protecting and monitoring of substations. The SA system comprises programmable secondary devices, so-called Intelligent Electronic Devices (IED), interconnected in a SA communication network, and interacting with the primary devices via a process interface. The IEDs are generally assigned to one of three hierarchical levels, namely the station level with the operators place including a Human-Machine Interface (HMI) as well as the gateway to the Network Control Centre (NCC), the bay level with its bay units for protection and control, and the process level. Process level units comprise e.g. electronic sensors for voltage, current and gas density measurements as well as contact probes for sensing switch and transformer tap changer positions, or breaker-IEDs controlling an actuator or drive of a circuit breaker or disconnector. Intelligent actuators or breaker-IEDs may be integrated in the respective intelligent primary equipment and connected to a bay unit via a serial link or optical process bus. The bay units are connected to each other and to the IEDs on the station level via an inter-bay or station bus.

Today's SA systems require interoperability between all substation devices independent of the manufacturer. Therefore, an internationally accepted communication standard for communication between the IEDs of a substation has been introduced. The IEC standard 61850 "communication networks and systems in substations" decouples the substation-specific application functionality from the substation communication-specific issues and to this end, defines an abstract object model for compliant substations, and a method how to access these objects over a network via an Abstract Communication Service Interface (ACSI). This allows the substation-specific applications such as the Operator Work Station (OWS) to operate with standard objects, while the actual IED-specific objects in the substation may be realized differently by the manufacturers of the IEDs. An abstract data model according to the standard incorporates SA functionality in terms of logical nodes grouped into logical devices and allocated to the IEDs as the physical devices. The communication-specific issues are handled via an ISO/OSI communication stack presently comprising a stack with MMS/TCP/IP/Ethernet and an optical physical layer. While the data model including attributes like time stamps or validity indications is realized by the application layer of the communication stack, messages for time-critical or safety-related communication, i.e. the Generic Object Oriented Substation Events (GOOSE) such as trips and blockings, as well as for analogue sampled values, are mapped directly to the Ethernet link layer of the communication stack.

One impact of the aforementioned interoperability requirement is that devices from different suppliers have to be combined into one SA system by the system integrator, and engineering data has to be exchanged between dedicated engineering or SA configuration tools of different suppliers during the commissioning process Therefore, the complete system with its entire devices and communication links has to be described in a formal way in the engineering process. This is enabled by the comprehensive XML-based Substation Configuration description Language (SCL) for IEC 61850 compliant systems that is part of the standard.

The SCL language is used to describe the capabilities of a particular IED or IED type in an IED Capability Description (ICD). It enumerates the communication and application functionality of the physical device as delimited e.g. by the number of I/O ports. A Substation Configuration Description (SCD) file in SCL language describes a model of a particular substation, the IED functions in terms of logical nodes, and the communication connections. The SCD file comprises (1) a switch yard naming and topology description, (2) IED configuration description (functions in terms of logical nodes), (3) Relation between switch yard and IED functions, (4) communication network description. Accordingly, if a particular IED is used within an SA system, then based on its ICD type description an object instance of the IED is inserted into the corresponding SCD file. The SCL language then allows specifying typical or individual values for data attributes carried by the instance and related to the particular IED, e.g. values for configuration attributes and setting parameters. The connection between the power process and the SA system is described in the SCL language by attaching logical nodes to elements of the primary equipment. Typically, a switch control logical node is attached to a switching device, whereas a measurement logical node or a protection function logical node is allocated to a bay unit.

In a substation engineering process, the SA configuration (topology, IED configuration and communication setup) is derived from the customer requirements and stored in an SCD file. For the actual installation or commissioning, all or parts of the configuration information previously engineered needs to be transferred to the physical devices, and the IEDs themselves need to be configured properly. As an SA system is a distributed system, this occurs sequentially, i.e. one IED after the other is loaded with substation-specific configuration data from the SCD file and put into operation. Furthermore, different IEDs might be loaded individually by different suppliers with their own proprietary tools. Part of this process is automated but most steps still require human interaction by commissioning or test engineers. All these activities are error-prone. Additional sources of inconsistency between the SCD file and the actual configuration of an individual IED arise from different versions of the SCL file used, or from the fact that IEDs allow their configuration to be changed locally, i.e. on the device itself.

As detailed above, the configuration as initially engineered and stored in the corresponding SCL files and the configuration found on the physical devices, i.e. the proper configuration of the device functions and/or allocation of logical nodes to the IED, may differ. Such inconsistencies may manifest themselves during or after a commissioning of an SA system. A test and commissioning engineer is then confronted with the following symptoms: no communication between two devices is occurring, or the data (according to a certain protocol) is incorrect or missing, and may seek to identify the IED being badly configured. On the other hand, and despite the fact that testing cannot guarantee the absence of errors in complex situations, the goal of the same engineer is to demonstrate the correct coordinated working of all parts in the most likely and important (intended) application scenarios.

In order to guarantee interoperability according to the global standard IEC 61850, to minimize the risk for system integration, and to assure correct working of a distributed SA system at start-up as well as during configuration changes, IEC 61850 has introduced a concept of configuration revision information for the abstract data model and the communication related definitions. This information can, and in the case of safety-related real time services like GSE (Generic Substation Event) and sampled values has, to be checked at the receiver to assure that his assumptions about message contents are consistent with the actual configuration state of the sender. The information about the revision actually used is available on-line, for real-time services even in each telegram sent. The receiver detects a revision mismatch by comparing the on-line revision information with its configuration based expected revision information, concludes on a change of sender data model, data set layout or communication definitions, and takes appropriate measures.

In the article by Wolfgang Wimmer entitled "IEC 61850—more than interoperable data exchange between engineering tools", presented at the PSCC Conference in Liege, Aug. 22-26, 2005, any SCL file comprises version and revision handling related information. A file header contains a document reference and a version/revision history for tracking of changes such as different versions of IED capability descriptions. However, such information may itself get lost while configuring IEDs, or updating information may inadvertently be ignored.

The patent application US 2002/0173927 relates to the testing of protection and control Intelligent Electronic Devices (IEDs) based on a data exchange using digital communication between the test system and the IED being tested. A test device (virtual IED) provides analogue currents and voltage waveforms over analogue signal lines to simulate the secondary currents and voltages seen by the IED under test. In addition, data packets containing status information related to the status of primary or secondary substation equipment during the simulated power system fault are sent to the IED over the communication link. The focus is on testing, i.e. a verification of the proper working of the configured device functions or allocated logical nodes, i.e. the verification of the expected correct action as triggered by the test device's output. However, the aforementioned patent application does not question the configuration of the IED under test, i.e. the proper configuration of the device functions and/or allocation of logical nodes to the IED.

SUMMARY

The disclosure relates to avoiding the difficulties arising from the abovementioned sources of error or inconsistency. A method of verifying the configuration of a first Intelligent Electronic Device and a configuration consistency verifier for a Substation Automation system are disclosed.

A method of verifying the configuration of a first Intelligent Electronic Device (IED) is disclosed that is part of a Substation Automation (SA) system, comprising reading first configuration information about the first IED from the first IED, transforming the first configuration information according to a dedicated data model, reading second configuration information about the first IED, transforming the second configuration information according to the dedicated data model, and comparing the transformed first and second configuration information.

A configuration consistency verifier for Substation Automation (SA) systems is disclosed, comprising means for reading and transforming first configuration information about a first IED of the SA system stored on an internal server of the first IED, means for reading and transforming second configuration information about the first IED from a second source, and means for comparing the transformed configuration information from the first IED and the second source.

In another aspect, a method of verifying the configuration of an electronic device of a substation automation system is disclosed. Such a method comprises reading first configuration information about the electronic device from the electronic device; transforming the first configuration information based on a dedicated data model; reading second configuration information about the electronic device; transforming the second configuration information according to the dedicated data model; comparing the transformed first and second configuration information; and identifying discrepancies or inconsistencies to resolve errors resulting from the configuration process.

BRIEF DESCRIPTION OF THE DRAWINGS

The subject matter of the disclosure will be explained in more detail in the following text with reference to exemplary embodiments which are illustrated in the attached drawings, wherein.

The reference symbols used in the drawings, and their meanings, are listed in summary form in the list of reference symbols. In principle, identical parts are provided with the same reference symbols in the figures.

DETAILED DESCRIPTION

According to the disclosure, the configuration of a first Intelligent Electronic Device (IED) that is part of a Substation Automation (SA) system and that has initially been configured to perform measurement, protection and/or control functions in accordance with a substation configuration specification, is read from an internal server of the first IED and transformed according to a dedicated data model. Related information is then read from e.g. a second IED that has initially been configured to perform the same functions as the first IED, or from a Substation Configuration Description (SCD) file, and transformed. The transformed data is then compared in order to identify discrepancies or inconsistencies and to resolve errors introduced by the IED configuration process. On the other hand, if no discrepancy is reported, it is concluded that the SA system is consistent and that a failure-free operation can be expected unless the opposite is proven.

In a first exemplary embodiment of the disclosure, this method is used in case of replacement of an IED for service reasons. In this case the configuration of both the original or first and the spare or second IED can be compared.

In a second exemplary embodiment of the disclosure, the information found on the configured IEDs of the substation is compared with the substation configuration information found as standardized substation-specific data in the SCD file as initially engineered. Thus, the disclosure allows for consistency verification without revision handling and achieves a reduction of the time and efforts for commissioning or testing a substation installation.

Figure 1:
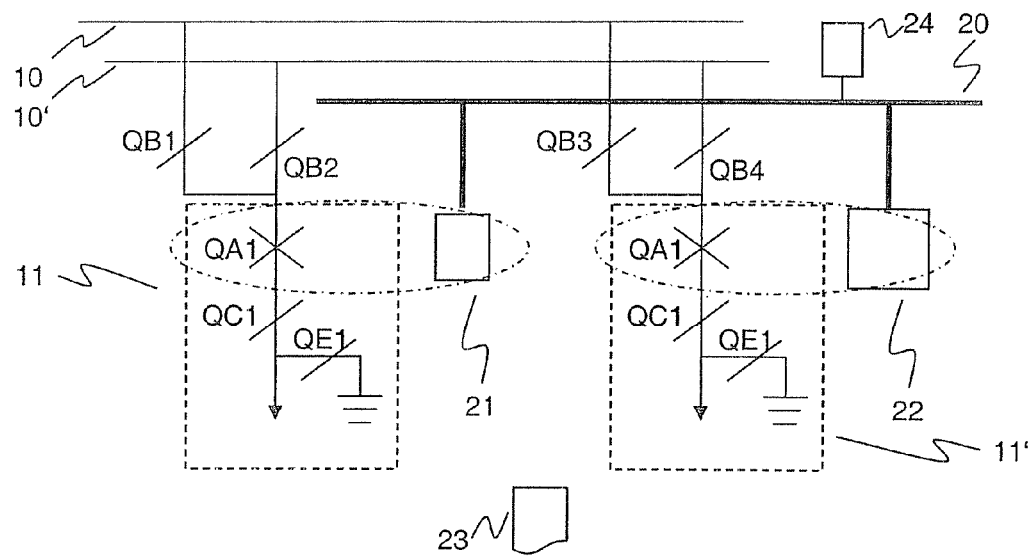
FIG. 1 shows an exemplary single line diagram of a substation.

FIG. 1 shows an exemplary single line diagram of a part or section of an exemplary substation at an assumed voltage level of e.g. 110 kV, together with some communication links and SA or secondary equipment. The model of a switch yard at single line level contains the topological respectively electrical connections between primary equipment. The substation comprises a double bus bar configuration with two bus bars 10, 10', each of them feeding two bays 11, 11' via disconnectors QB1 to QB4. Each bay comprises a circuit breaker QA1, a disconnector QC1 and an earthing switch QE1. The corresponding excerpt of the SA system depicts, in bold lines, a communication network 20 connected to two IEDs 21, 22, which both host logical nodes of class CSWI (switch control). Each logical node is allocated to one of the aforementioned circuit breakers QA1 as indicated by the dash-dot lines. A Substation Configuration Description (SCD) file 23 comprises an SCL description of the substation including IEDs 21, 22. A configuration consistency verifier 24 as a dedicated software tool implemented on a computer is connected to the communication network 20.

Figure 2:
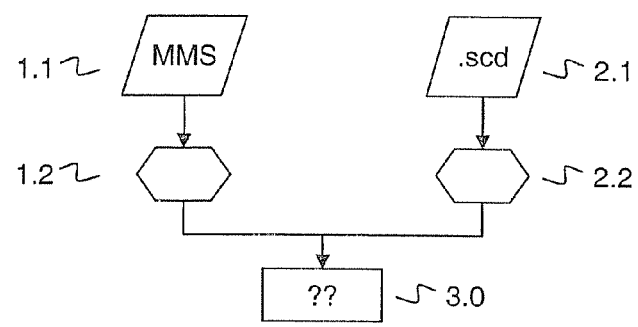
FIG. 2 is a flowchart of an exemplary configuration verification process.

FIG. 2 depicts a flowchart of the process comprising the following steps.

In step 1.1, the information of interest is read by the configuration consistency verifier 24 from the first IED 21 by accessing, through an Abstract Communication Service Interface (ACSI), the Manufacturing Message Specification (MMS) server residing on the IED. This information is basically equivalent to a Configured IED Description (CID) in terms of the Substation Configuration Language (SCL), but residing on the first IED 21 as local data in a format specific of the manufacturer of the IED.

In step 1.2, this data is transformed or translated by the configuration consistency verifier 24 and according to a dedicated, abstract or "meta" data model, into information corresponding to the 61850 data model description or any other equivalent data structure. In other words, the semantic content of the data from the first IED 21 is extracted and converted into an instance of the dedicated data model.

In step 2.1, corresponding information about the first IED 21 is accessed at the same time, from a SCD file 23 which contains a description of the first IED 21. The SCD file 23 typically was created during the engineering process of the substation to which IED 21 belongs. A corresponding exemplary excerpt of the SCD file 23 including the IP address on line 6 reads as follows:

```
<Header id="AASP2B" version="1" revision="1"
nameStructure="IEDName"/>
<Communication>
SubNetwork name="P2WA1" type="8-MMS">
<ConnectedAP iedName="P2KA1" apName="S1">
<Address>
<P type="IP">10.3.100.228</P>
<P type="IP-SUBNET">255.255.255.0</P>
<P type="OSI-AP-Title">1,3,9999,23</P>
<P type="OSI-PSEL">00000001</P>
<P type="OSI-SSEL">0001</P>
<P type="OSI-TSEL">0001</P>
</Address>
```

In step 2.2, the SCD file 23 is parsed and its relevant contents are rearranged and transformed into information corresponding to the 61850 data model description.

In step 3.0 finally, the two transformed data sets are compared, revealing e.g. an object, element or attribute in one data set that has no corresponding object, element or attribute in the other data set, or two corresponding objects of the same type and name in the two data sets that do not have the same value. This comparison may extend over any data type that is defined in the standard IEC 61850.

The transformation rules are derivable from the description of the standard: IEC 61850-6, First edition, 2004-03, entitled "Communication networks and systems in substations", Part 6: "Configuration description language for communication in electrical substations related to IEDs", reference number IEC 61850-6:2004(E). By way of example, section 9.3.4 directed to logical devices lists related general statements, attributes and restrictions as quoted in the following three paragraphs.

The LDevice element defines a logical device of the IED reachable via the access point. It shall contain at least one LN and the LN0, and may contain preconfigured report, GSE and SMV definitions.

TABLE 14

Attributes of the LDevice element

| Attribute name | Description |
|---|---|
| Inst | Identification of the LDevice within the IED. The full LD name according to IEC 61850-7-x contains an additional part before this inst value (see also 8.4). Its value cannot be the empty string |
| desc | The description text |

Restrictions
The LD inst shall be unique within the IED.
The LD name built from inst and other parts as described in 8.4 shall be unique within each SCL file.
The length of the attribute inst shall be at least one.

Further relevant information, e.g. for communication purposes, may be obtained from other sections, whereas not all information contained in the abovementioned section 9.3.4 (e.g. services) may be required for the purpose of this disclosure. However, the totality of all information relevant to a data type defined in the standard IEC 61850 unambiguously indicates to a skilled person how to execute the proposed transformation.

In an exemplary embodiment different from the one described in context with FIG. 2 above, a second IED 22 rather than the SCD file 23 may serve as the second source of information accessed in step 2.1 and to be compared with the information originating directly from the first IED 21. This is the case e.g. if the configurations of two supposedly identical IEDs, either for redundant operation or for the purpose of replacing one another, are to be compared. Likewise, two IEDs with identical functionality, but placed in different bays of the substation, may be checked for discrepancies other than their IP address.

In various exemplary embodiments, attribute values may be corrected at steps 1.2 or 2.2 if a-priori knowledge about the substation indicates that they are wrong. For instance, a server in an IED must contain an LLN0 node. Accordingly, a missing LLN0 node can be inserted automatically by the configuration consistency verifier. Likewise, missing IP addresses can be attributed or provided with the help of the configuration consistency verifier.

As the revelation of differing or missing contents does not comprise an indication as to which of the two values is the correct one, the outcome of the comparison is processed or analysed according to specific user requirements. Any divergence may be repaired according to rules defined in the 61850 standard or by the user himself.

It will be appreciated by those skilled in the art that the present invention can be embodied in other specific forms without departing from the spirit or essential characteristics thereof. The presently disclosed exemplary embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIOINS

| | |
|---|---|
| 10 | bus bar |
| 11 | bay |
| 20 | communication network |
| 21 | first Intelligent Electronic Device (IED) |
| 22 | second IED |
| 23 | SCD file |
| 24 | configuration consistency verifier |

What is claimed is:

1. A method of verifying the configuration of a first Intelligent Electronic Device (IED) that is part of a Substation Automation (SA) system through a configuration device over a communication network, the method as performed by the configuration device comprising:
    reading first configuration information about the first IED from the first IED over the communication network,
    transforming the first configuration information from a first data format to a data format of a dedicated data model,
    reading second configuration information about the first IED over the communication network,
    transforming the second configuration information from a second data format of a third data model to the data format of the dedicated data model, and
    comparing the transformed first and second configuration information to determine whether the first and second configuration information have matching content.

2. The method according to claim 1, comprising reading the second configuration information from a second IED that has the same functions as the first IED over the communication network.

3. The method according to claim 1, comprising reading the second configuration information as standardized substation-specific data from a Substation Configuration Description (SCD) file describing the configuration of the SA system over the communication network.

4. The method according to claim 3, wherein the standardized substation-specific data is described according to the standard IEC 61850.

5. The method according to claim 1, comprising:
    reading the first configuration information according to a first data model;
    reading the second configuration information according to the first data model;
    transforming the first and second configuration information from the first and second data formats, respectively to the data format of the dedicated data model, which is a second data model.

6. A configuration consistency verifier for Substation Automation (SA) systems, comprising:
    means for reading and transforming first configuration information about a first IED of the SA system stored on an internal server of the first IED, wherein the first configuration information is transformed from a first data format to a data format of a dedicated data model,
    means for reading and transforming second configuration information about the first IED from a second source, wherein the second configuration information is transformed from a second data format to the data format of the dedicated data model, and
    means for comparing the transformed configuration information from the first IED and the second source to determine whether the configuration information of the first IED and the second source have matching content.

7. A method of verifying the configuration of an electronic device of a substation automation system through a configuration device over a communication network, the method as performed by the configuration device comprising:
    reading first configuration information about the electronic device from the electronic device over the communication network;
    transforming the first configuration information in first data format to a data format of a dedicated data model;
    reading second configuration information about the electronic device over the communication network;
    transforming the second configuration information from a second data format to the data format of the dedicated data model;
    comparing the transformed first and second configuration information; and
    identifying discrepancies or inconsistencies to resolve errors resulting from the configuration process.

* * * * *